(No Model.)
M. J. CASWELL.
KETTLE DRAINER.
No. 563,136. Patented June 30, 1896.
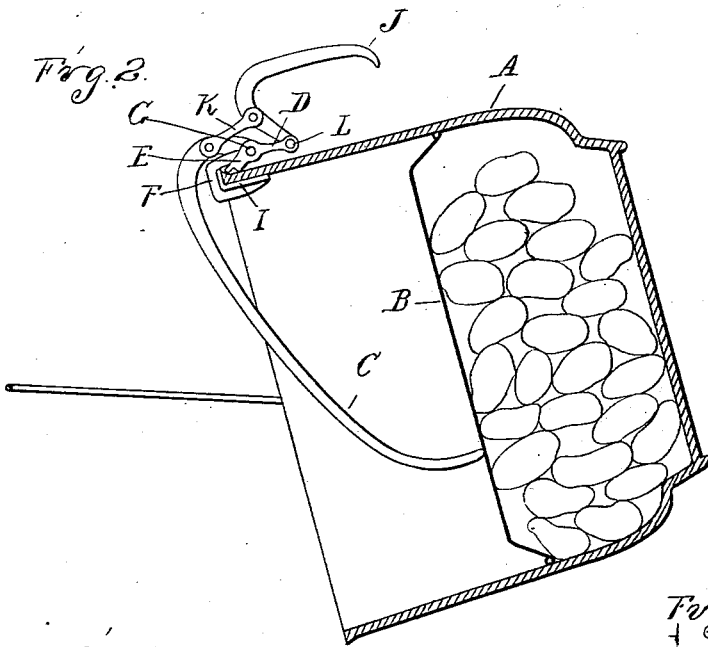
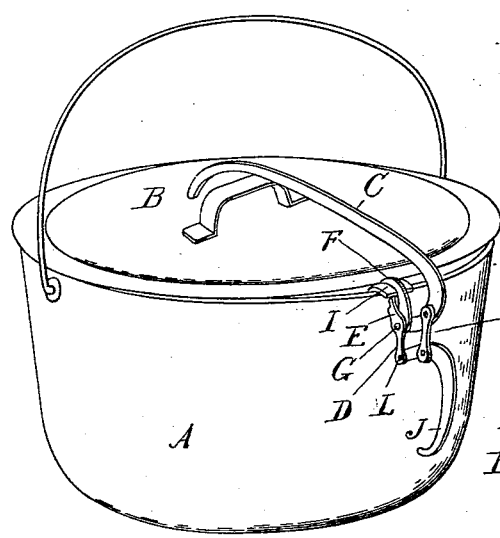
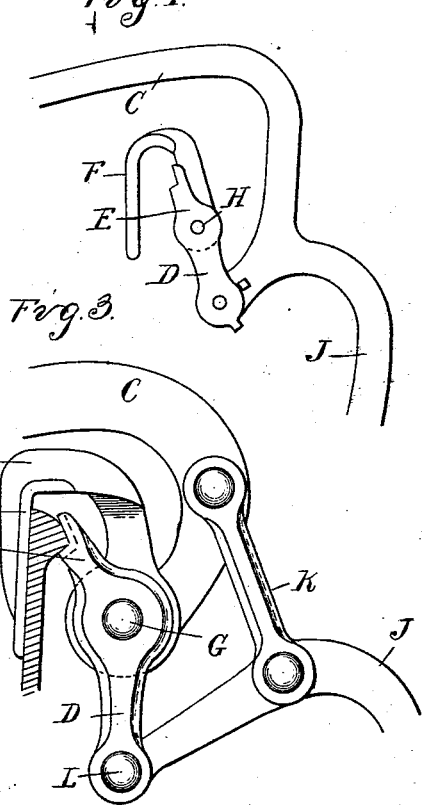
Witnesses
A. L. Hobby
O. F. Bartlett
Inventor
Myron J. Caswell
By Wm. T. Sprague
Attys.

UNITED STATES PATENT OFFICE.

MYRON JOSIAH CASWELL, OF SANDUSKY, OHIO, ASSIGNOR OF ONE-HALF TO JACOB B. CONRADI, OF SAME PLACE.

KETTLE-DRAINER.

SPECIFICATION forming part of Letters Patent No. 563,136, dated June 30, 1896.

Application filed October 21, 1895. Serial No. 566,316. (No model.)

*To all whom it may concern:*

Be it known that I, MYRON JOSIAH CASWELL, a citizen of the United States, residing at Sandusky, in the county of Erie and State of Ohio, have invented certain new and useful Improvements in Kettle-Drainers, of which the following is a specification, reference being had therein to the accompanying drawings.

The invention consists in the construction of a device comprising a handle, a grip adapted to be engaged with the edge of the kettle, and an arm extending from the grip over the edge of the kettle to contact and hold down the cover, the parts being so combined that on lifting the handle the grip will be applied and the cover-holding arm will be held in contact with the cover while pouring out the fluid or draining the kettle.

The invention further consists in the construction, arrangement, and combination of the various parts, all as more fully hereinafter described.

In the drawings, Figure 1 is a perspective view of a kettle, showing my device applied thereto with the overlapping cover. Fig. 2 is a vertical section through a kettle in the position to be drained, showing my device applied thereto with a cover arranged inside the kettle. Fig. 3 is an enlarged elevation of the grip, arm, handle, and connecting mechanism. Fig. 4 is a similar elevation of a slightly-modified form of these parts.

A is the kettle. B is the cover thereof.

C is the curved arm adapted to extend over the upper edge of the kettle and contact the cover with one end, while the other end projects down beside the upper edge of the kettle. On the end of this arm is pivoted a lever D, which is adapted to contact the outer edge of the kettle and is preferably provided with a notched bar E to engage with the usual edge rim on the kettle.

F is a hook which may be pivoted on the same pivot-point G upon which the lever is journaled, or it may be pivoted, as shown in Fig. 4, upon a separate pin H on the lever. This hook is adapted to engage over the edge of the kettle and to contact the inner face thereof, and is preferably provided with the side flanges I to give it a wide bearing on the top of the edge of the kettle to prevent tendency of side tipping.

J is a handle so connected to the arm C and lever D as to actuate them for the purpose of forcing the arm on the cover and to cause the upper end of the lever to contact with pressure the outer side of the kettle. The hook and the lever together form what I call the "grip."

The connection which I have shown in Fig. 3, and which I prefer, between the handle and the lever and the arm, consists of a link K between the arm C and the handle J and a pivotal connection, as shown at L, between the end of the handle and the end of the lever. I may, however, make a rigid connection between the handle and the arm, as shown in Fig. 4.

The parts being thus constructed their operation is as follows: The operator engages the hook over the upper edge of the kettle. The arm will project into the kettle and press on the cover. In lifting on the handle the lever will be rocked about its pivot and contact the outer face of the kettle, the hook remaining stationary and thus firmly gripping the kettle. The same lifting movement through the connection between the handle and the arm will cause the arm to constantly remain in contact with the cover regardless of whether the cover is stationary on the top of the kettle or whether it is within the kettle and move down as the fluid is drained out.

While I have specially designed this for draining fluids from solids for culinary purposes, it is evident that it may be used for pouring or draining for any purpose.

What I claim as my invention is—

1. A kettle-drainer comprising in combination a handle, a cover-holder consisting of an arm adapted to project over the edge of the kettle and contact the cover, a grip for the edge of the kettle pivotally supported on said arm, and connection between the handle, the cover-holder and the grip whereby on lifting on the handle the grip and cover-holder are actuated substantially as described.

2. The combination of a curved arm extending over the edge of the kettle and free of the same, a hook, a pivoted lever adapted to engage the outer face of the edge, supported on the outer end of the arm, and a handle for lifting the kettle and which actuates the lever and arm, substantially as described.

3. The combination of a curved arm, a hook and a lever pivoted on the end of said arm adapted to engage the inside and outside faces thereof respectively, a handle pivoted to the end of the lever and a link connection between the arm and handle, substantially as described.

In testimony whereof I affix my signature in presence of two witnesses.

MYRON JOSIAH CASWELL.

Witnesses:
  JOHN QUINN,
  FRED W. SEHER.